Patented Jan. 16, 1951

2,538,611

UNITED STATES PATENT OFFICE 2,538,611

PROCESS OF PREPARING DERIVATIVES OF 3-KETO-Δ4-ETIOCHOLENIC ACID

Alfred L. Wilds, Madison, Wis., assignor to Wisconsin Alumni Research Foundation, Madison, Wis., a corporation of Wisconsin No Drawing. Application October 23, 1948,
Serial No. 56,255

5 Claims. (Cl. 260—397.1)

The present invention relates to an improved process of preparing unsaturated ketone compounds and particularly derivatives of multi-ring α,β-unsaturated keto-acids having utility in the hormone field. More specifically, the present invention relates to an improved process of preparing derivatives of 3-keto-Δ4-etiocholenic acid.

The adrenal cortical hormone, desoxycorticosterone acetate, has been prepared heretofore by reacting 3-acetoxy-Δ5-etiocholenic acid with thionyl chloride to form the acid chloride, reacting the acid chloride with diazomethane to form the diazoketone, followed by hydrolysis and oxidation, and finally reaction of the resulting 21-diazoprogesterone with acetic acid to form the acetate. Reichstein et al., Helv. Chim. Acta 23, 136 (1940). Prior attempts to prepare this hormone product from 3-keto-Δ4-etiocholenic acid and thus avoid the selective hydrolysis and oxidation of the diazoketone, have proven unsatisfactory primarily because of the difficulties encountered in preparing the acid chloride. This is due primarily to the presence of the α,β-unsaturated ketone grouping which has been found to be sensitive to reagents, such as thionyl chloride, normally used to prepare acid chlorides.

To avoid the difficulties encountered in preparing the acid chloride of the 3-keto-Δ4-derivatives, a complicated six step procedure for converting the 3-keto-Δ4-steroids into the 3-acetoxy-Δ5 derivatives has been proposed. Reich et al., Helv. Chim. Acta 29, 671 (1946). This procedure with reoxidation to the 3-keto-Δ4 derivative at a later stage has also been employed in a partial synthesis of 11-dehydrocorticosterone. V. Euw et al., Helv. Chim. Acta 29, 1913 (1946).

The principal object of the present invention is to provide an improved process of preparing derivatives of compounds characterized by the presence of an α,β-unsaturated ketone grouping.

A more specific object of the present invention is to provide a relatively simple, practical process of preparing derivatives, including the acid halides, of 3-keto-Δ4-etiocholenic acid compounds.

Other objects will be apparent as the detailed description proceeds hereinafter.

I have discovered an improved process for preparing derivatives of unsaturated ketones particularly adaptable for use in preparing derivatives of 3-keto-Δ4-etiocholenic acid and like compounds characterized by the presence of the α,β-unsaturated ketone grouping. The process which employs the alkali metal salt of the acid and an oxalyl halide such as oxalyl chloride is described in detail in the following illustrative example.

*Acid chloride of 3-keto-Δ4-etiocholenic acid (II)*

A solution of about 506 mg. of 3-keto-Δ4-etiocholenic acid in 19 ml. of 0.091 N sodium hydroxide is first frozen and evaporated to dryness under reduced pressure and the residue made up of the sodium salt of 3-keto-Δ4-etiocholenic acid dried at 110° C. (0.1 mm.) for about 8 hours. After cooling, about 10 ml. of dry thiophene-free benzene and 3 drops of pyridine are added and mixed thoroughly with the salt. To this mixture cooled in an ice bath is next added 2 ml. of redistilled oxalyl chloride. There is an immediate evolution of gas which stops after a few seconds. The mixture is then allowed to warm to 15° C., and when no further evolution of gas is noticed, e. g. at the end of 4 minutes, the solvent is evaporated under reduced pressure, keeping the temperature below 15° C. at all times. The resulting acid chloride of the 3-keto-Δ4-etiocholenic acid is then dissolved in about 5 ml. of benzene and filtered through a dry sintered glass funnel into a cooled receiver in order to remove sodium chloride.

*21-diazoprogesterone (III)*

The acid chloride prepared as described above is diluted with an equal volume of ether. The ether solution is then added slowly to a cooled (—15° C.) ethereal solution of diazomethane (prepared from six grams of nitrosomethylurea). The process described in "Organic Reactions," vol. 1, p. 50, 1942 (edited by Roger Adams), may be used. The resulting reaction mixture is maintained at —15° C. for about one half hour and then at 0° C. for one half hour. The solvent is then evaporated under reduced pressure and with trituration of the residual oil with acetone the diazoketone is obtained as a light yellow product which decomposes at about 177–178° C.

*Desoxycorticosterone acetate (IVa)*

To about 10 ml. of boiling purified acetic acid is slowly added about 163 mg. of 21-diazoprogesterone prepared as described above. There is an immediate evolution of nitrogen. The resulting light yellow solution is refluxed for about 3 minutes, the acetic acid evaporated under reduced pressure and the residual oil dissolved in acetone. On cooling long needles are obtained which change to a powder upon drying at room temperature. Additional amounts of the desired product may be obtained after molecular distillation of the filtrate at about 160° C. (0.001 mm.). Upon recrystallization from acetone the desoxycorticosterone acetate is obtained in good yield with a melting point of about 158–159° C.

Desoxycorticosterone (IVb)

Hydrolysis of the acetate product prepared above by the method of Reichstein and von Euw as reported in Helv. Chim. Acta. 21, 1181 (1938) gave desoxycorticosterone. After molecular distillation at 150° C. (0.001 mm.) and two recrystallizations from acetone-ether the product is obtained in pure form with a melting point of 140–142° C.

The basic reactions involved in the preparation of the desoxycorticosterone acetate may be illustrated by the following formulas.

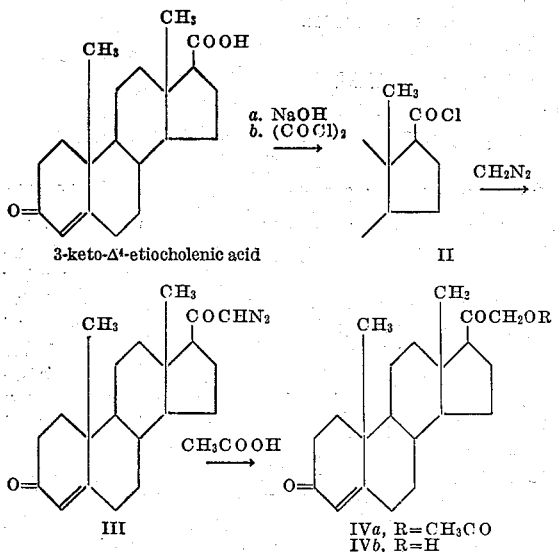

Investigations have demonstrated the process of the present invention to be relatively simple and to be much preferred over processes available heretofore. Based on the 3-keto-$\Delta^4$-etiocholenic acid, the overall yield of 21-diazoprogesterone obtained is over 80 per cent of the theoretical yield, and the overall yield of desoxycorticosterone acetate obtained is over 70 per cent. In addition to improved yields, the process of the present invention has also been found to be relatively easy to control and to be practical and adaptable for commercial operations.

The process of the present invention may be used to advantage to prepare derivatives of 17-carboxylic acids of the $\Delta^4$-polyhydro-dimethyl-cyclopenteno-phenanthrene series. Examples are the 11-oxygenated derivatives of 3-keto-$\Delta^4$-etiocholenic acid such as the 3,11-diketo-$\Delta^4$-etiocholenic acid. The reactions and procedures employed are similar to those described in the above illustrative example starting with the proper etiocholenic acid.

I claim:

1. The process of preparing an acid halide of an $\alpha,\beta$-unsaturated keto acid which comprises reacting an alkali metal salt of the keto acid in a cooled reaction medium with oxalyl halide.

2. The process of preparing an acid chloride of a 17-carboxylic acid-3-keto-$\Delta^4$-polyhydro-dimethyl-cyclopenteno-phenanthrene which comprises reacting an alkali metal salt of the 17-carboxylic acid in a cooled reaction medium with oxalyl chloride.

3. The process of preparing the acid chloride of 3-keto-$\Delta^4$-etiocholenic acid which comprises treating the sodium salt of 3-keto-$\Delta^4$-etiocholenic acid in a cooled reaction medium with oxalyl chloride.

4. The process of preparing desoxycorticosterone acetate which comprises treating the sodium salt of 3-keto-$\Delta^4$-etiocholenic acid with oxalyl chloride while maintaining the reaction mixture below 15° C., treating the resulting acid chloride with diazomethane, and reacting the resulting diazoketone with acetic acid to form the desired acetate product.

5. The process of preparing an acid halide of a 17-carboxylic acid-3-keto-$\Delta^4$-polyhydro-dimethyl-cyclopenteno-phenantherene which comprises reacting an alkali metal salt of the 17-carboxylic acid in a cooled reaction medium with oxalyl halide.

ALFRED L. WILDS.

REFERENCES CITED

The following references are of record in the file of this patent:

Adams: Jour. Am. Chem. Soc., 42, pages 599–611 (1920).